(12) United States Patent
Dick et al.

(10) Patent No.: US 11,181,193 B2
(45) Date of Patent: Nov. 23, 2021

(54) POWER OFF HYDRAULIC DEFAULT STRATEGY

(71) Applicant: Allison Transmission, Inc., Indianapolis, IN (US)

(72) Inventors: Elizabeth P. Dick, Mooresville, IN (US); Bryan H. Hagelskamp, Carmel, IN (US)

(73) Assignee: Allison Transmission, Inc., Indianapolis, IN (US)

(*) Notice: Subject to any disclaimer, the term of this patent is extended or adjusted under 35 U.S.C. 154(b) by 92 days.

(21) Appl. No.: 16/698,309

(22) Filed: Nov. 27, 2019

(65) Prior Publication Data
US 2021/0156469 A1  May 27, 2021

(51) Int. Cl.
*F16H 61/02* (2006.01)
*F16H 61/12* (2010.01)
(Continued)

(52) U.S. Cl.
CPC ......... *F16H 61/0206* (2013.01); *F16H 61/12* (2013.01); *F16H 61/0021* (2013.01);
(Continued)

(58) Field of Classification Search
CPC .. F16H 61/0206; F16H 61/12; F16H 61/0021; F16H 2061/1268;
(Continued)

(56) References Cited

U.S. PATENT DOCUMENTS

| 3,667,501 A | 6/1972 | Snoy et al. |
| 4,070,927 A | 1/1978 | Polak |

(Continued)

FOREIGN PATENT DOCUMENTS

| JP | 2013145016 A | 7/2013 |
| JP | 2016-194313 | 11/2016 |

(Continued)

OTHER PUBLICATIONS

Chabot, Bob, "The Need for 10-speeds," Motor, motor.com, Jun. 2017, https://222.motor.com/magazine-summary/need-10-speeds, 12 pages.

(Continued)

*Primary Examiner* — David J Hlavka
(74) *Attorney, Agent, or Firm* — Faegre Drinker Biddle & Reath LLP

(57) ABSTRACT

A multi-speed planetary transmission is operable in at least nine forward speed ratios, at least one reverse speed ratio, and at least one neutral speed ratio. A hydraulic control system for the transmission includes a hydraulic default control system and is operable to a default configuration when a default condition occurs during operation of the transmission. The hydraulic control system defaults to a forward default gear ratio during operation of the transmission in a first forward speed ratio and defaults to a default neutral speed ratio during operation of the transmission in a reverse speed ratio when a default condition occurs. The default condition may be a transmission control module ("TCM") power failure.

23 Claims, 13 Drawing Sheets

(51) Int. Cl.
*F16H 61/686* (2006.01)
*F16H 61/00* (2006.01)

(52) U.S. Cl.
CPC .... *F16H 61/686* (2013.01); *F16H 2061/1232* (2013.01); *F16H 2061/1268* (2013.01); *F16H 2200/2012* (2013.01); *F16H 2200/2046* (2013.01)

(58) Field of Classification Search
CPC ..... F16H 2200/2012; F16H 2200/2046; F16H 61/686; F16H 2061/1232
See application file for complete search history.

(56) References Cited

U.S. PATENT DOCUMENTS

| | | | |
|---|---|---|---|
| 4,106,367 A | 8/1978 | Bouvet | |
| 4,495,837 A | 1/1985 | Morscheck | |
| 4,631,982 A | 12/1986 | Miki et al. | |
| 4,827,806 A | 5/1989 | Long et al. | |
| 4,838,298 A | 6/1989 | Cleasby | |
| 4,887,491 A | 12/1989 | Holbrook et al. | |
| 5,399,130 A | 3/1995 | Long | |
| 5,492,028 A | 2/1996 | Raszkowski | |
| 5,496,231 A | 3/1996 | Eaton | |
| 5,682,791 A | 11/1997 | Liesener | |
| 5,738,608 A | 4/1998 | Long | |
| 5,919,108 A | 7/1999 | Takagi | |
| 6,120,406 A * | 9/2000 | Redlinger | F16H 61/12 475/132 |
| 6,155,949 A | 12/2000 | Long et al. | |
| 6,319,164 B1 | 11/2001 | Runde et al. | |
| 6,464,609 B1 | 10/2002 | Bai et al. | |
| 6,494,802 B2 | 12/2002 | Lee et al. | |
| 6,520,881 B1 | 2/2003 | Long et al. | |
| 6,585,617 B1 | 7/2003 | Moorman et al. | |
| 6,634,377 B1 | 10/2003 | Stafford | |
| 6,634,988 B2 | 10/2003 | Shultz et al. | |
| 6,796,330 B1 | 9/2004 | Moorman | |
| 6,832,632 B1 | 12/2004 | Wallace | |
| 7,220,206 B2 | 5/2007 | Borgerson et al. | |
| 7,285,066 B2 | 10/2007 | Long et al. | |
| 7,288,039 B2 | 10/2007 | Foster et al. | |
| 7,322,899 B1 | 1/2008 | Long et al. | |
| 7,364,527 B2 | 4/2008 | Klemen | |
| 7,395,837 B2 | 7/2008 | Foster et al. | |
| 7,396,306 B2 | 7/2008 | Long et al. | |
| 7,510,496 B2 | 3/2009 | Long et al. | |
| 7,549,942 B2 | 6/2009 | Gumpoltsberger | |
| 7,651,427 B2 | 1/2010 | Long et al. | |
| 7,666,112 B2 | 2/2010 | Long et al. | |
| 7,695,398 B2 | 4/2010 | Phillips et al. | |
| 7,736,269 B2 | 6/2010 | Long et al. | |
| 7,823,473 B2 | 11/2010 | Uberti et al. | |
| 7,878,934 B2 | 2/2011 | Lee | |
| 7,896,769 B2 | 3/2011 | Long et al. | |
| 7,980,995 B2 | 7/2011 | Weber et al. | |
| 7,993,231 B2 | 8/2011 | Shimizu et al. | |
| 8,052,563 B2 | 11/2011 | Ellis et al. | |
| 8,100,803 B2 | 1/2012 | Foster et al. | |
| 8,113,988 B2 | 2/2012 | Foster | |
| 8,172,060 B2 | 5/2012 | Seid et al. | |
| 8,172,711 B2 | 5/2012 | Ishikawa et al. | |
| 8,210,976 B2 | 7/2012 | Xie et al. | |
| 8,210,990 B2 | 7/2012 | Yoshioka et al. | |
| 8,371,988 B2 | 2/2013 | Long et al. | |
| 8,413,777 B2 | 4/2013 | Lundberg et al. | |
| 8,435,148 B2 | 5/2013 | Moorman | |
| 8,464,851 B2 | 6/2013 | Moorman | |
| 8,500,600 B2 | 8/2013 | Moorman | |
| 8,591,381 B2 | 11/2013 | Zhang et al. | |
| 8,613,681 B2 | 12/2013 | Sowards et al. | |
| 8,834,310 B2 | 9/2014 | Goleski et al. | |
| 8,852,049 B2 | 10/2014 | Long et al. | |
| 9,097,338 B2 | 8/2015 | Hagelskamp | |
| 9,182,034 B2 | 11/2015 | Long et al. | |
| 9,222,578 B2 | 12/2015 | Long | |
| 9,254,831 B2 | 2/2016 | Berger et al. | |
| 9,267,582 B2 | 2/2016 | Long et al. | |
| 9,347,555 B2 | 5/2016 | Long et al. | |
| 9,447,868 B2 | 9/2016 | Hagelskamp | |
| 9,512,919 B2 | 12/2016 | Kinch | |
| 9,562,594 B2 | 2/2017 | Long et al. | |
| 9,625,007 B2 | 4/2017 | Long et al. | |
| 9,683,666 B2 | 6/2017 | Kinch | |
| 9,765,877 B2 | 9/2017 | Long et al. | |
| 9,856,974 B2 | 1/2018 | Knoth et al. | |
| 10,161,506 B2 | 12/2018 | Ghike et al. | |
| 10,161,508 B2 | 12/2018 | Whitmarsh | |
| 2005/0059522 A1 | 3/2005 | Park | |
| 2006/0184303 A1 | 8/2006 | Long et al. | |
| 2007/0049442 A1 | 3/2007 | Long et al. | |
| 2011/0167812 A1 | 7/2011 | Moorman | |
| 2012/0261008 A1 | 10/2012 | Long et al. | |
| 2015/0027259 A1* | 1/2015 | Long | F16H 61/12 74/473.11 |
| 2015/0075315 A1 | 3/2015 | Hagelskamp | |
| 2016/0167635 A1 | 6/2016 | Neelakantan et al. | |
| 2016/0327152 A1 | 11/2016 | Whitmarsh | |
| 2016/0328153 A1* | 11/2016 | Krause | G06F 12/1009 |
| 2017/0030419 A1 | 2/2017 | Mitsubori et al. | |
| 2017/0067558 A1 | 3/2017 | Knoth et al. | |
| 2017/0268666 A1* | 9/2017 | Ghike | F16D 48/06 |
| 2018/0003295 A1* | 1/2018 | Ghike | F16H 57/0412 |
| 2019/0003578 A1 | 1/2019 | Tryon et al. | |
| 2019/0003579 A1 | 1/2019 | Tryon et al. | |
| 2019/0003580 A1 | 1/2019 | Tryon et al. | |
| 2019/0003585 A1 | 1/2019 | Tryon et al. | |
| 2019/0017592 A1 | 1/2019 | Berger et al. | |

FOREIGN PATENT DOCUMENTS

| | | |
|---|---|---|
| KR | 10-2011-0082474 | 7/2011 |
| KR | 20150076682 A | 7/2015 |
| WO | WO2007077663 A1 | 7/2007 |
| WO | WO2015137906 A1 | 9/2015 |

OTHER PUBLICATIONS

"Inside the fuel-efficient 9-speed 9G-Tronic from Mercedes-Benz," Green Car Congress, greencarcongress.com, Mar. 6, 2014, https://www.greencarcongress.com/2014/03/20140306-9gtronic.html, 38 pages.
International Search Report issued by the International Searching Authority, dated Mar. 2, 2021, for International Patent Application No. PCT/US2020/060660; 4 pages.
Written Opinion issued by the International Searching Authority, dated Mar. 2, 2021, for International Patent Application No. PCT/US2020/060660; 7 pages.

* cited by examiner

| RANGE | CLUTCH APPLY TABLE | | | | | | DEFAULT APPLY TABLE | |
|---|---|---|---|---|---|---|---|---|
| | 202 | 204 | 206 | 208 | 210 | 212 | 256 | 270 |
| REV | | | 1 | | 1 | | | On (Destroked) |
| N (210) | 1 | | | | | | | On (Destroked) |
| N (206) | 1 | | | | | | | On (Destroked) |
| N (208) | 1 | | | 1 | | | | On (Destroked) |
| 1 | 1 | | | | 1 | | On | On (Destroked) |
| 2 | 1 | | 1 | | | | On | On (Destroked) |
| 3 | 1 | 1 | | | | | On | On (Destroked) |
| 4 | | 1 | | 1 | | | On | On (Destroked) |
| 5 | | 1 | 1 | | | | On | On (Destroked) |
| 6 | | 1 | | | | 1 | On | On (Destroked) |
| 7 | | 1 | 1 | | | | On | On (Destroked) |
| 8 | | | 1 | | 1 | | | On (Destroked) |
| 9 | | | 1 | | | 1 | | On (Destroked) |
| Forward Default | | | 1 | | | | | Off (Stroked) |
| Reverse Default | | | 1 | | | | | Off (Stroked) |

"1" = ENGAGED CONFIGURATION
"BLANK" = DISENGAGED CONFIGURATION

FIG. 4

POWER OFF HYDRAULIC DEFAULT STRATEGY

FIELD OF THE DISCLOSURE

The present disclosure relates to a hydraulic control strategy for a hydraulic control system of a transmission and, in particular, to a default condition strategy for a hydraulic control system of a multi-speed transmission.

BACKGROUND OF THE DISCLOSURE

Known multi-speed planetary transmission use a plurality of interconnectors and selective couplers to achieve a plurality of forward and reverse speed ratios between at least one input member and at least one output member operatively connected to the multi-speed transmission. The selective couplers are selectively engaged to establish each of the plurality of forward and reverse speed ratios. The engagement of selective couplers may be controlled by a hydraulic control system. The hydraulic control system may include a default control subsystem that controls the engagement of the selective couplers during a default condition.

SUMMARY OF THE DISCLOSURE

The present disclosure relates to a hydraulic control strategy for a hydraulic control system of a transmission. In an exemplary embodiment of the present disclosure, a hydraulic control system for a transmission having an input member and an output member and operable in at least one forward speed ratio between the output member and the input member and in at least one reverse speed ratio between the output member and the input member is disclosed. The hydraulic control system comprises a hydraulic default control system including a first valve assembly having a first control valve controlled by a first solenoid and a second valve assembly having a second control valve controlled by a second solenoid. The hydraulic default control system is configured to shift the transmission to a first default speed ratio when the transmission is operating in a first one of the at least one forward speed ratio and experiences a default condition and to shift the transmission to a second one of the at least one default speed ratio when the transmission is operating in a reverse speed ratio and experiences the default condition.

In another exemplary embodiment of the present disclosure, a hydraulic control system for a transmission is disclosed. The hydraulic control system comprises a hydraulic default control system including a first valve assembly having a first control valve controlled by a first solenoid and a second valve assembly having a second control valve controlled by a second solenoid. The first and second valve assemblies are configured to shift the transmission from a first forward speed ratio to a default speed ratio based on an electrical signal to at least one of the first and second valve assemblies.

In a further exemplary embodiment of the present disclosure, a transmission having an input member and output member and operable in at least one forward speed ratio between the output member and the input member and at least one reverse speed ratio between the output member and the input member is disclosed. The transmission comprises a plurality of planetary gearsets operatively coupled to the input member and a plurality of selective couplers operatively coupled to the plurality of planetary gearsets. Each of the plurality selective couplers has an engaged configuration and a disengaged configuration, and the plurality of selective couplers are selectively engageable to establish the at least one forward speed ratio and the at least one reverse speed ratio between the output member and the input member. The transmission further comprises a hydraulic control system hydraulically coupled to the plurality of selective couplers and including a hydraulic default control system. The hydraulic default control system is configured to selectively engage at least a first portion of the plurality of selective couplers to establish a first default speed ratio when the transmission is operating in the at least one forward speed ratio and experiences a default condition and is configured to selectively engage at least a second portion of the plurality of selective couplers to establish a second default speed ratio when the transmission is operating in the at least one reverse speed ratio and experiences the default condition.

In some instances throughout this disclosure and in the claims, numeric terminology, such as first, second, third, and fourth, is used in reference to various operative transmission components and other components and features. Such use is not intended to denote an ordering of the components. Rather, numeric terminology is used to assist the reader in identifying the component being referenced and should not be narrowly interpreted as providing a specific order of components.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 4 is a truth table illustrating the selective engagement of the six selective couplers of FIGS. 2A and 2B to provide nine forward gear or speed ratios, a reverse gear or speed ratio, three neutral gear or speed ratios, and two default gear or speed ratios;

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE DRAWINGS

Figure 1:
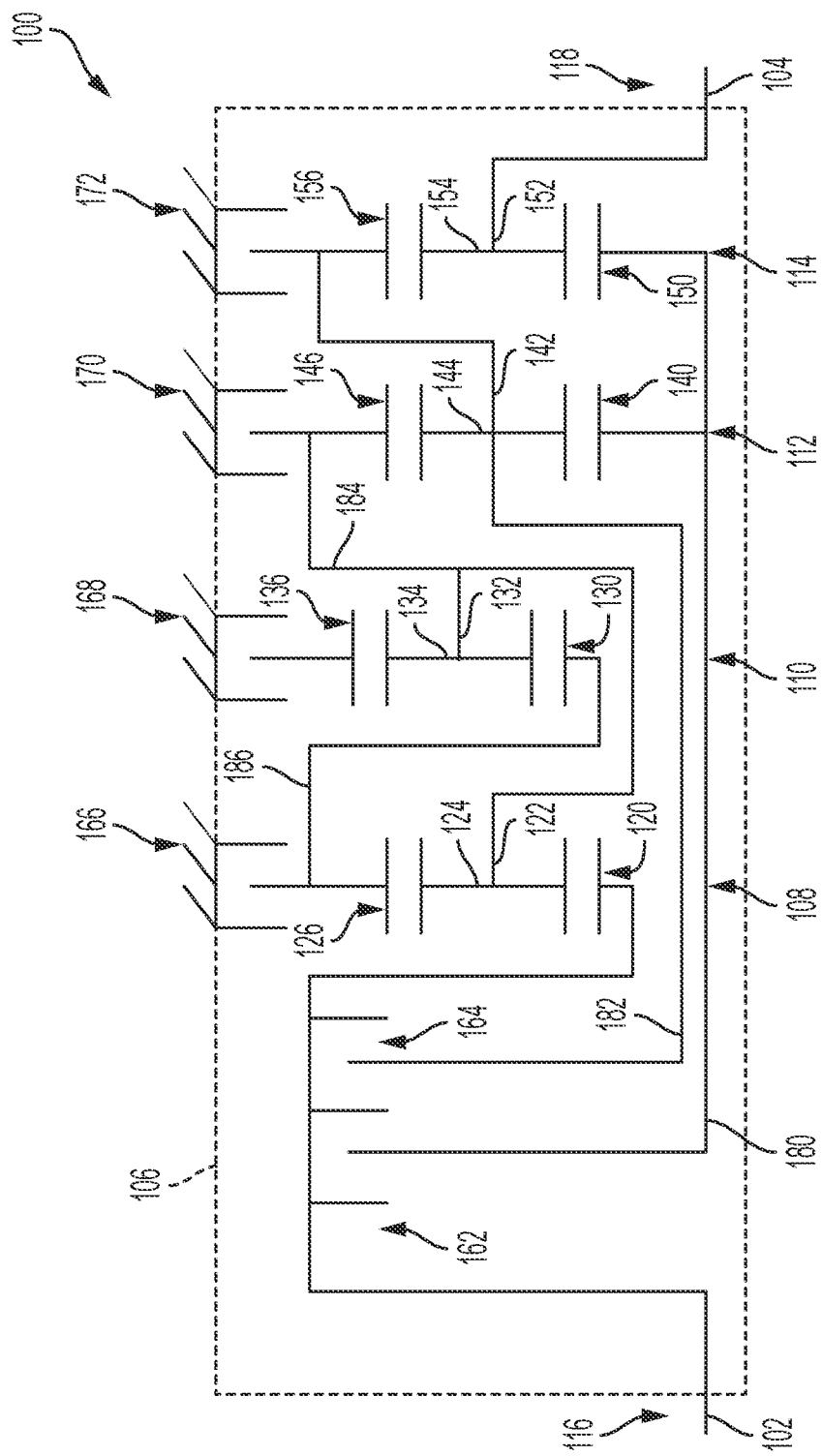
FIG. 1 is a diagrammatic view of an illustrative multi-speed transmission including four planetary gearsets, six selective couplers, and eight interconnectors.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

In the exemplary transmission embodiment, torque and rotational motion are transferred from an input member to an output member through a multi-speed transmission. To facilitate the transfer of torque and rotational motion to the output member at different selected gear ratios, the multi-speed transmission includes a plurality of operative transmission components. Simply put, an operative transmission component is a device or component that carries torque and rotational motion within the transmission. One or more parts of the operative transmission component may be rotatable to form a rotatable transmission component. Operative transmission components illustratively include selective couplers, interconnectors, sun gears, planet carrier assemblies, and ring gears.

A clutch is an example of a selective coupler. A clutch couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A second exemplary selective coupler is a brake. A brake couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers may be actively controlled devices or passive devices. Exemplary actively controlled devices include hydraulically actuated clutch or brake elements and electrically actuated clutch or brake elements. Additional details regarding systems and methods for controlling selective couplers are disclosed in U.S. Pat. No. 9,625,007, the entirety of which is incorporated by reference.

In addition to coupling through selective couplers, various components of the disclosed transmission embodiments may be fixedly coupled together continuously throughout the operation of the disclosed transmissions. Components may be fixedly coupled together either permanently or removably. Components may be fixedly coupled together through spline connections, fasteners, welding, machined or formed functional portions of a unitary piece, interference fit connections, or other suitable methods of connecting components.

Interconnectors include one or more rotating components, such as shafts, drums, and other components fixedly coupled together. Interconnectors may further be fixedly coupled to one or more other operative transmission components.

FIG. 1 is a diagrammatic representation of an exemplary multi-speed transmission 100. Multi-speed transmission 100 includes an input member 102 and an output member 104. Each of input member 102 and output member 104 is rotatable relative to at least one stationary member 106. An exemplary input member 102 is an input shaft or other suitable rotatable component. Input member 102 is rotated by a prime mover. Exemplary prime movers include internal combustion engines, electric motors, hybrid power systems, and other suitable power systems. In one embodiment, the prime mover indirectly rotates the input member through a clutch and/or a torque converter. An exemplary output member 104 is an output shaft or other suitable rotatable component. Output member 104 provides rotational power to one or more working components. Exemplary working components include one or more drive wheels of a motor vehicle, a power take-off shaft, and other suitable devices. Output member 104 is rotated based on the interconnections of the operative transmission components of the transmission 100. By changing the interconnections of the operative transmission components, a rotation speed of output member 104 may be varied from a rotation speed of input member 102. An exemplary stationary member 106 is a housing of multi-speed transmission 100. The housing may include several components coupled together. In the exemplary embodiment shown in FIG. 1, input member 102 enters stationary member 106 at a first location or end 116 and output member 104 exits stationary member 106 at a second location or end 118.

Multi-speed transmission 100 includes at least one planetary gearset. In the exemplary embodiment of FIG. 1, multi-speed transmission 100 includes a plurality of planetary gearsets, illustratively a first planetary gearset 108, a second planetary gearset 110, a third planetary gearset 112, and a fourth planetary gearset 114. In another embodiment, additional planetary gearsets may be included. Further, although first planetary gearset 108, second planetary gearset 110, third planetary gearset 112, and fourth planetary gearset 114 are illustrated as simple planetary gearsets, it is contemplated that compound planetary gearsets may be included in some embodiments. Additionally, the arrangement of the plurality of planetary gearsets is exemplary.

First planetary gearset 108 includes a sun gear 120, a planet carrier 122 supporting a plurality of planet gears 124, and a ring gear 126. Second planetary gearset 110 includes a sun gear 130, a planet carrier 132 supporting a plurality of planet gears 134, and a ring gear 136. Third planetary gearset 112 includes a sun gear 140, a planet carrier 142 supporting a plurality of planet gears 144, and a ring gear 146. Fourth planetary gearset 114 includes a sun gear 150, a planet carrier 152 supporting a plurality of planet gears 154, and a ring gear 156.

Multi-speed transmission 100 further includes a plurality of selective couplers, illustratively a first selective coupler 162, a second selective coupler 164, a third selective coupler 166, a fourth selective coupler 168, a fifth selective coupler 170, and a sixth selective coupler 172. In the illustrated embodiment, first selective coupler 162 and second selective coupler 164 are clutches and third selective coupler 166, fourth selective coupler 168, fifth selective coupler 170, and sixth selective coupler 172 are brakes. The axial locations of the clutches and brakes relative to the plurality of planetary gearsets may be altered from the illustrated axial locations. In alternative embodiments, any number of clutches and brakes may be used.

Multi-speed transmission 100 includes several components that are illustratively shown as being fixedly coupled together. Input member 102 is fixedly coupled to sun gear 120 of first planetary gearset 108. Output member 104 is fixedly coupled to fp152 of fourth planetary gearset 114. Ring gear 126 of first planetary gearset 108 is fixedly coupled fp130 of fp110. Planet carrier 122 of first planetary gearset 108 is fixedly coupled to fp132 of fp110 and ring gear 146 of third planetary gearset 112. In alternative embodiments, one or more of the components fixedly coupled together are selectively coupled together through one or more selective couplers.

Multi-speed transmission 100 may be described as having six interconnectors. Input member 102 is a first interconnector that provides both input torque and rotational motion to multi-speed transmission 100 and is fixedly coupled to sun gear 120 of first planetary gearset 108. Input member 102 is further fixedly coupled to fp162 and fp164. Output member 104 is a second interconnector that provides output torque and rotational motion from multi-speed transmission 100. A third interconnector 180 fixedly couples fp140 of fp112 and fp150 of fp114 together. Third interconnector 180 is further fixedly coupled to fp162. A fourth interconnector 182 fixedly couples fp142 of fp112 and fp156 of fp114 together. Fourth interconnector 182 is further fixedly coupled to fp164 and fp172. A fifth interconnector 184 fixedly couples planet carrier 132 of second planetary gearset 110 to fp132 of fp110 and fp146 of fp112. Fifth interconnector 184 if further fixedly coupled to fp170. A sixth interconnector 186 fixedly couples fp126 of fp108 to fp130 of fp110. Sixth interconnector 186 is further fixedly coupled to fp166. Each interconnector may include multiple components that are fixedly coupled together.

Multi-speed transmission 100 further includes several components that are illustratively shown as being selectively coupled together through selective couplers. By engaging various combinations of first selective coupler 162, second selective coupler 164, third selective coupler 166, fourth selective coupler 168, fifth selective coupler 170, and sixth selective coupler 172, additional components of multi-speed transmission 100 may be fixedly coupled together. Thus, the plurality of planetary gearsets and the plurality of selective couplers of multi-speed transmission 100 may be interconnected in various arrangements to provide torque and rotational motion from input member 102 to output member 104 in a plurality of forward gear or speed ratios and reverse gear or speed ratios. FIG. 1 is a representative view of an exemplary transmission. Additional details regarding the exemplary transmission are disclosed in U.S. Pat. No. 7,364,527, filed on Sep. 23, 2005, titled NINE SPEED AUTOMATIC TRANSMISSION WITH SIX TORQUE-TRANSMITTING MECHANISMS, the entirety of which is incorporated herein by reference.

Figure 2A:
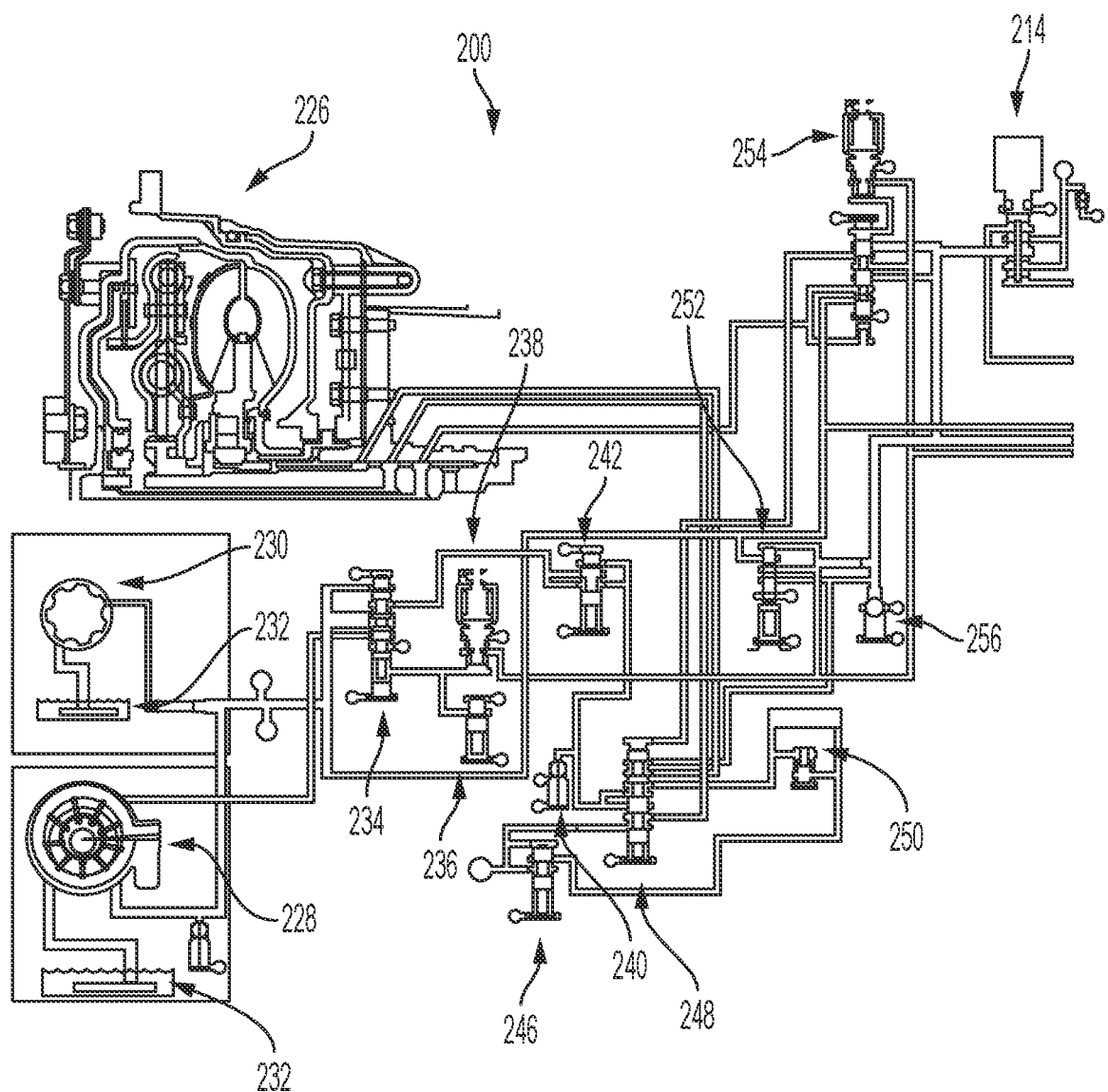
FIGS. 2A and 2B are a schematic view of an exemplary hydraulic control system for a multi-speed transmission having six selective couplers.
Figure 2B:
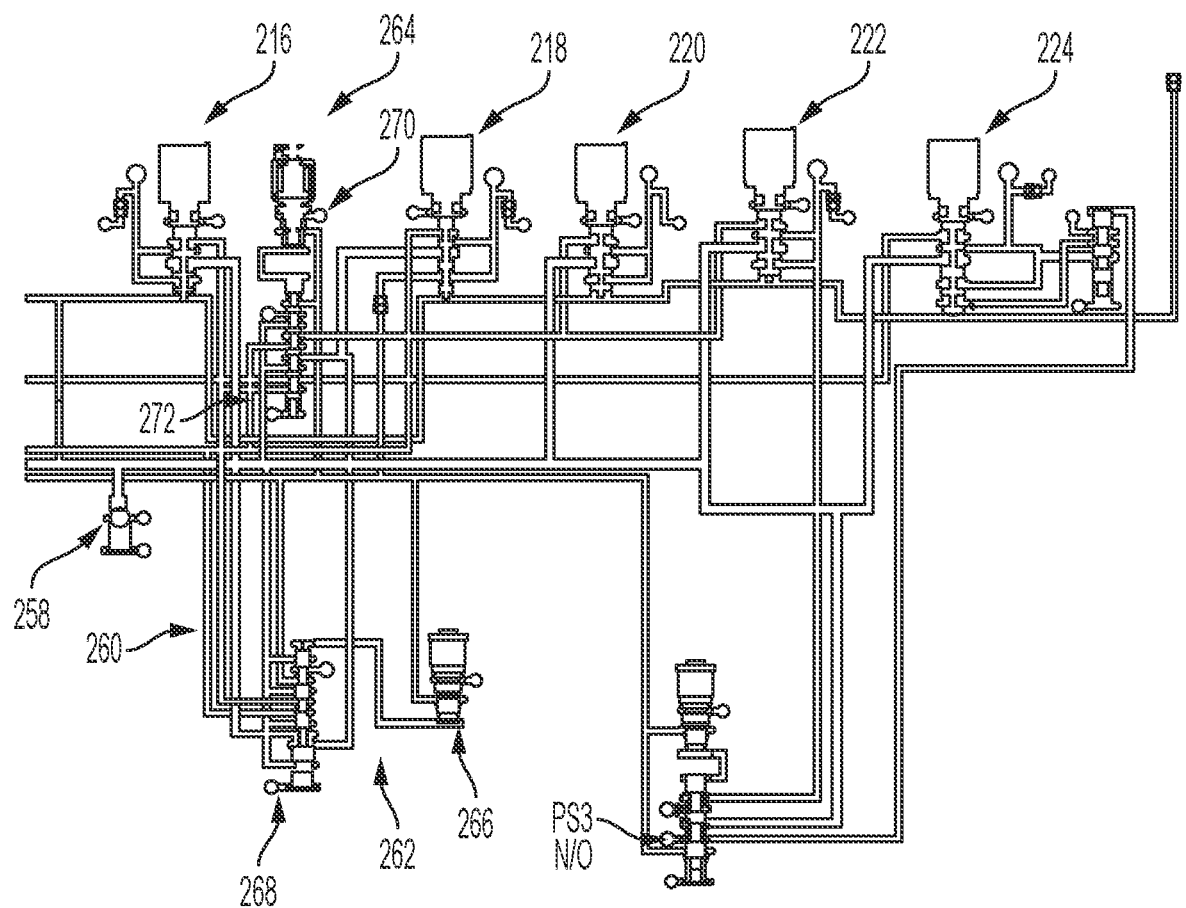

Referring now to FIGS. 2A and 2B, an exemplary hydraulic control system 200 for a multi-speed planetary transmission is shown. Control system 200 is configured to control the selective engagement of a plurality of selective couplers, illustratively a first selective coupler 202, a second selective coupler 204, a third selective coupler 206, a fourth selective coupler 208, a fifth selective coupler 210, and a six selective coupler 212 (see FIG. 4). Control system 200 is hydraulically coupled to each of the selective couplers using an electro-hydraulic valve or transmission solenoid assembly, illustratively a linear force solenoid assembly. More specifically, first selective coupler 202 is controlled by a first linear force solenoid assembly 214, second selective coupler 204 is controlled by a second linear force solenoid assembly 216, third selective coupler 206 is controlled by a third linear force solenoid assembly 218, fourth selective coupler 208 is controlled by a fourth linear force solenoid assembly 220, fifth selective coupler 210 is controlled by a fifth linear force solenoid assembly 222, and six selective coupler 212 is controlled by a sixth linear force solenoid assembly 224.

Each of first linear solenoid assembly 214, second linear solenoid assembly 216, third linear solenoid assembly 218, fourth linear solenoid assembly 220, fifth linear solenoid assembly 222, and sixth linear solenoid assembly 224 includes a solenoid assembly and a control valve having a valve body. The valve body illustratively includes a chamber and associated hydraulic fluid ports. The associated hydraulic fluid ports are further connected to hydraulic passages formed in the valve body. A rotationally symmetrical valve spool is received within the chamber of the valve body and is sized for reciprocal movement therein. The valve spool includes a plurality of lands spaced along a central shaft of the valve spool. The central shaft is radially smaller than each of the lands. The valve spool is moveable within the valve body due to forces from the hydraulic pressure within the control valve and due to the selective energization of the solenoid assembly. Thus, the lands of the valve spool are operable to selectively regulate a flow of hydraulic fluid through the fluid ports to control an engagement of the respective selective coupler and, therefore, control the operation of the multi-speed transmission. Additional details regarding the structure and operation of first linear solenoid assembly 214, second linear solenoid assembly 216, third linear solenoid assembly 218, fourth linear solenoid assembly 220, fifth linear solenoid assembly 222, and sixth linear solenoid assembly 224 can be found in U.S. Patent Application Publication No. 2019/0178370, filed Dec. 6, 2018, the entirety of which is incorporated by reference.

Control system 200 includes a torque converter 226, a main pump 228, and an auxiliary pump 230. Main pump 228 and auxiliary pump 230 are configured to provide a main supply of pressurized hydraulic fluid for selectively engaging the selective couplers. In the exemplary embodiment shown, main pump 228 is a rotary or vane pump fluidly coupled to a sump 232, and auxiliary pump 230 is a gerotor pump fluidly coupled to sump 232 and driven with an electric motor. Auxiliary pump 230 is driven by the electric motor in order to provide main supply of pressurized hydraulic fluid when the prime mover is no longer supply rotational motion to input member 102 such as, for example, when the prime mover is turned off. More specifically, auxiliary pump 230 supplies a sufficient hydraulic pressure to at least one of the selective couplers to hold the vehicle stopped on a inclined surface. The sufficiency of the hydraulic pressure may be based on, for example, the gross vehicle weight rating ("GVWR") or the gross vehicle mass ("GVM"). While auxiliary pump 230 is illustrated as fluidly coupled to sump 232, it is contemplated that auxiliary pump 230 could be fluidly coupled to a sump separate from sump 232. In other embodiments, pumps 228, 230 may comprise a different type of positive displacement pump. In further embodiments, pumps 228, 230 may comprise identical positive displacement pumps.

Torque converter 226, main pump 228, auxiliary pump 230, first linear solenoid assembly 214, second linear solenoid assembly 216, third linear solenoid assembly 218, fourth linear solenoid assembly 220, fifth linear solenoid assembly 222, and sixth linear solenoid assembly 224 are hydraulically coupled together through various components such as, for example, a main regulator valve 234, a main accumulator valve 236, a main variable force solenoid 238, a torque converter blow off valve 240, a torque converter feed limit valve 242, a lubricant feed limit valves 246, a torque converter flow valve 248, a thermal cool bypass valve and cooler 250, a main control valve 252, a torque converter trim valve 254, a first exhaust back flow relief valve 256, and a second exhaust back flow relief valve 258.

Control system 200 also includes a hydraulic default control system 260 hydraulically coupled to main pump 228, first linear solenoid assembly 214, second linear solenoid assembly 216, third linear solenoid assembly 218, fourth linear solenoid assembly 220, fifth linear solenoid assembly 222, and sixth linear solenoid assembly 224. Default control system 260 includes first valve assembly 262 and a second valve assembly 264. First valve assembly 262 illustratively includes a solenoid 266 hydraulically coupled to a control valve 268. Similarly, second valve assembly 264 illustratively includes a solenoid 270 hydraulically coupled to a control valve 272.

Figure 3:
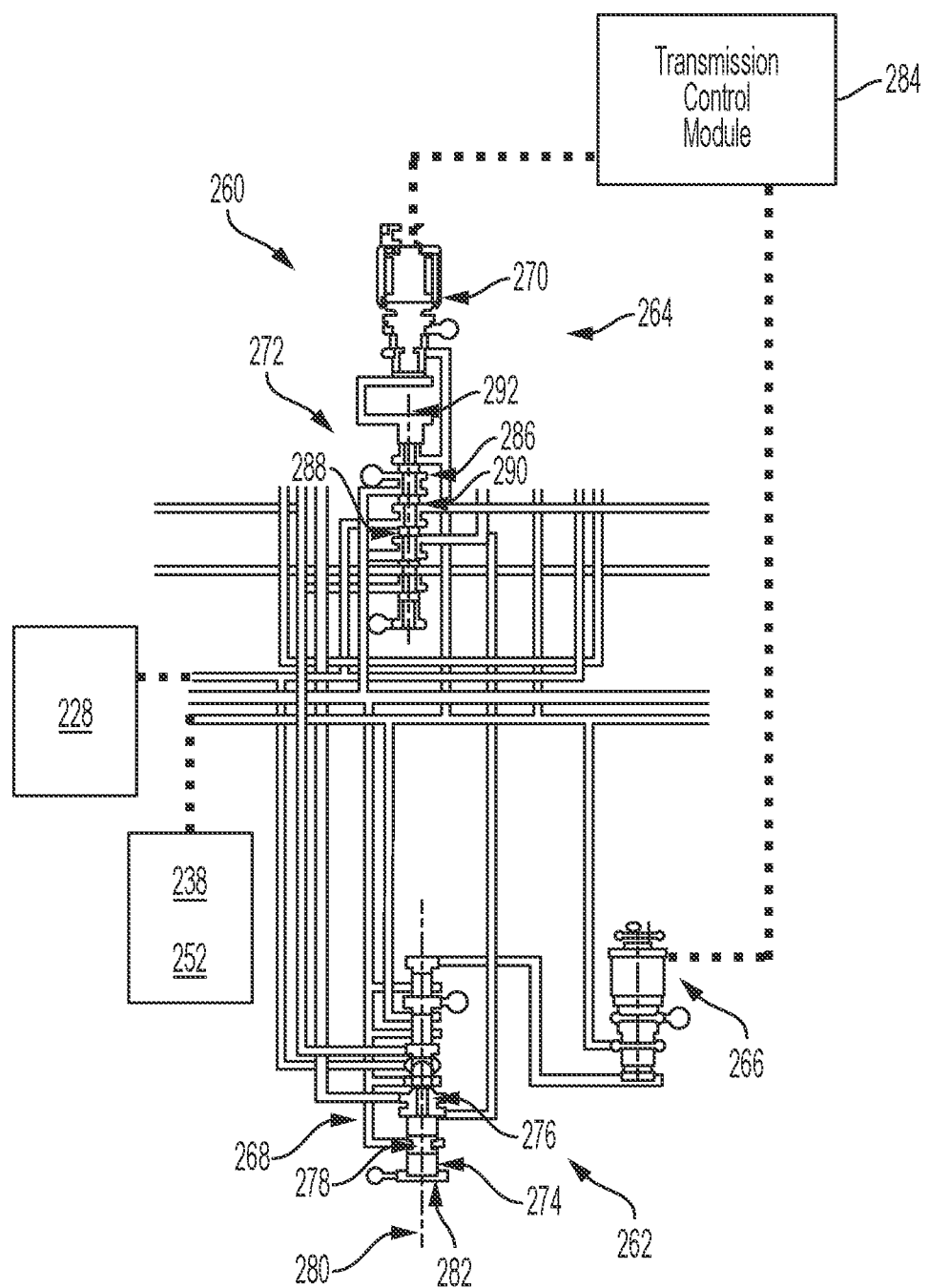
FIG. 3 is a schematic view of a hydraulic default control system of the hydraulic control system of FIGS. 2A and 2B.

Hydraulic default control system 260 is shown in more detail in FIG. 3. Control valve 268 of valve assembly 262 includes a valve body 274 having a chamber 276 and associated hydraulic fluid ports, which are connected to hydraulic passages formed in valve body 274. A rotationally symmetrical valve spool 278 is received within chamber 276 of valve body 274 and is sized for reciprocal movement therein along an axis 280 between an actuated position (see FIG. 7A) and an unactuated position (see FIG. 10A). Valve spool 278 includes a plurality of lands spaced along a central shaft of valve spool 278. The central shaft of chamber 276 is radially smaller than each of the lands. Valve spool 278 is moveable along axis 280 within valve body 274 due to the forces from the hydraulic pressure within valve body 274, the selective energization of solenoid 266, and a biasing member 282 that biases valve spool 278 to the unactuated position. Thus, the lands of valve spool 278 are operable to selectively regulate a flow of hydraulic fluid through the fluid ports.

Solenoid 266 is hydraulically coupled to control valve 268 as well as main variable force solenoid 238 and main control valve 252. In the exemplary embodiment shown, solenoid 266 is a hydraulic on/off solenoid that selectively applies hydraulic pressure to control valve 268 to move valve spool 278 along axis 280 from the unactuated position to the actuated position. More specifically, when electrical power is supplied to solenoid 266, solenoid 266 applies hydraulic pressure to control valve 268 to move valve spool 278 to the actuated position. In the absence of electrical power to solenoid 266, biasing member 282 biases valve spool 278 to the unactuated position. The selective energization of solenoid 266 is illustratively controlled by a transmission control module ("TCM") 284, which is electrically coupled to solenoid 266. More specifically, TCM 284 provides an electrical signal, illustratively electrical power, to solenoid 266 to transition solenoid 266 from an unenergized configuration or state to an energized state. In other embodiments, solenoid 266 may be a variable force solenoid.

Control valve 272 of valve assembly 264 includes a valve body 286 having a chamber 288 and associated hydraulic fluid ports, which are connected to hydraulic passages formed in valve body 286. A rotationally symmetrical valve spool 290 is received within chamber 288 of valve body 286 and is sized for reciprocal movement therein along an axis 292 between an actuated position (see FIG. 7B) and an unactuated position (see FIG. 7A). Valve spool 290 includes a plurality of lands spaced along a central shaft of valve spool 290. The central shaft of valve spool 290 is radially smaller than each of the lands. Valve spool 290 is moveable along axis 292 within valve body 286 due to the forces from the hydraulic pressure within valve body 286 and the selective energization of variable force solenoid 270. Control valve 272 also includes a biasing member tending to bias valve spool 290 along axis 292 to the destroked position when no hydraulic pressure is applied to the opposite end of valve spool 290. Thus, the lands of valve spool 290 are operable to selectively regulate a flow of hydraulic fluid through the fluid ports.

Solenoid 270 is hydraulically coupled to control valve 272 as well as main variable force solenoid 238 and main control valve 252. In the exemplary embodiment shown, solenoid 270 is a variable force solenoid that selectively applies hydraulic pressure to chamber 276 to move valve spool 290 along axis 292 from the unactuated position to the actuated position. More specifically, when electrical power is supplied to solenoid 270, solenoid 270 does not apply hydraulic pressure to control valve 272. As a result, valve spool 278 is moveable along axis 292 depending on the hydraulic passage of valve body 286 that receives pressurized hydraulic fluid.

Figure 7A:
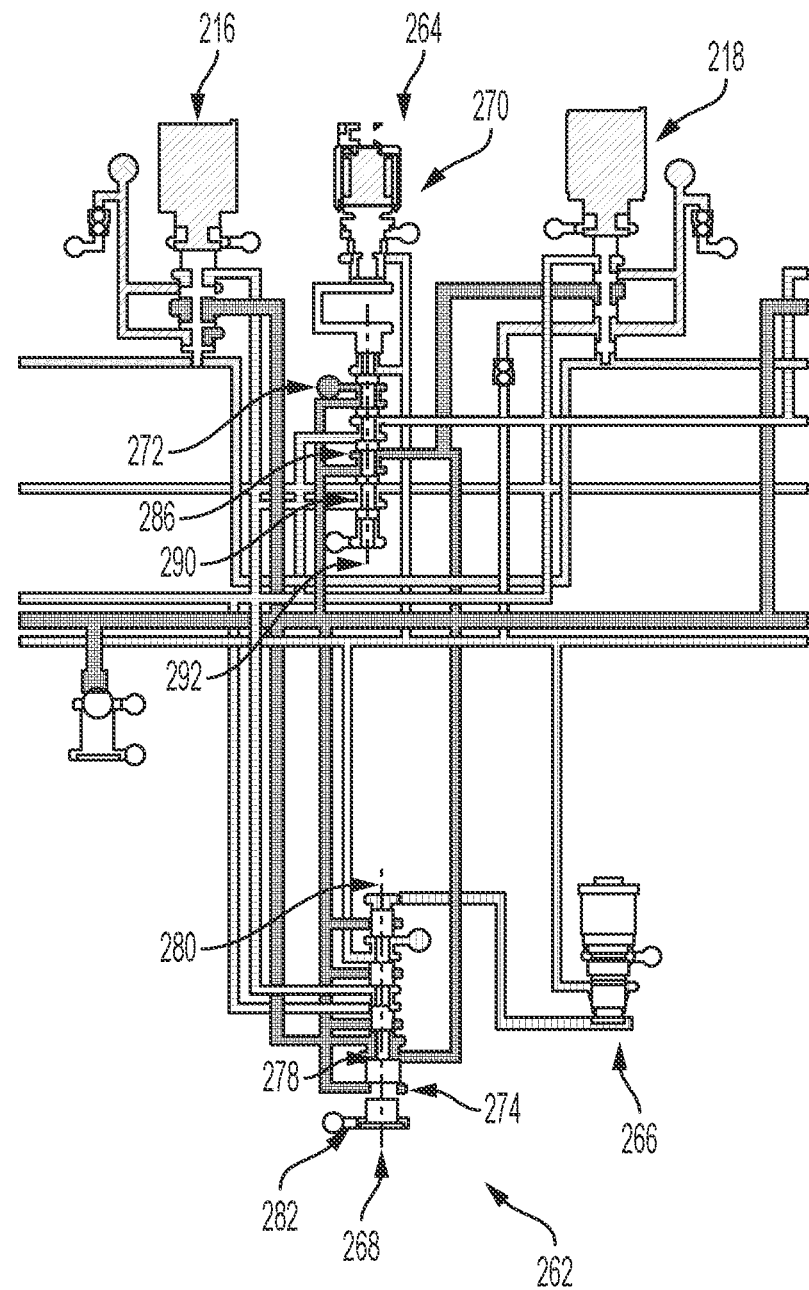
FIG. 7A is a partial schematic view of a hydraulic default control system of the hydraulic control system of FIGS. 2A and 2B when the multi-speed planetary transmission is operating in the first forward speed ratio.
Figure 7B:
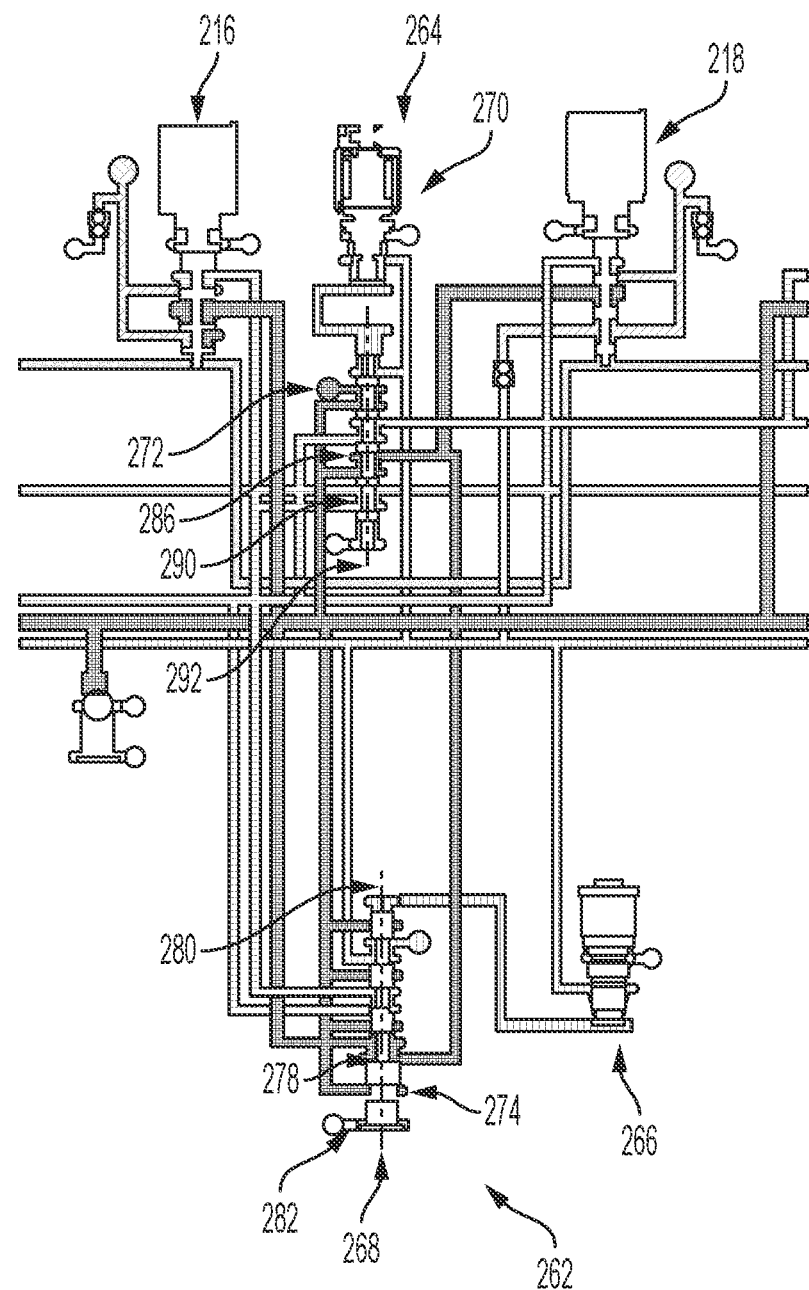
FIG. 7B is a partial schematic view of the hydraulic default control system of the hydraulic control system of FIGS. 2A and 2B when the multi-speed planetary transmission is operating in the first default speed ratio.

In the absence of electrical power to solenoid 270, solenoid 270 applies hydraulic pressure to control valve 272 to move valve spool 278 to the actuated position (see FIG. 7B). The selective energization of solenoid 270 is illustratively controlled by TCM 284, which is electrically coupled to solenoid 270. More specifically, TCM 284 provides an electrical signal, illustratively electrical power, to solenoid 270 to transition solenoid 270 from an unenergized configuration or state to an energized state. In other embodiments, solenoid 270 may be a hydraulic on/off solenoid.

Control system 200 controls the selective engagement of first selective coupler 202, second selective coupler 204, third selective coupler 206, fourth selective coupler 208, fifth selective coupler 210, and sixth selective coupler 212 to establish at least nine forward speed ratios, at least one reverse speed ratio, at least one neutral speed ratio, and at least one default speed ratio. With reference now to FIG. 4, an exemplary truth table 300 is shown that provides the state of each of first selective coupler 202, second selective coupler 204, third selective coupler 206, fourth selective coupler 208, fifth selective coupler 210, and sixth selective coupler 212 for nine different forward gear or speed ratios, one reverse gear or speed ratio, three neutral gear or speed ratios, and two default gear or speed ratios. Each row of truth table 300 corresponds to a given interconnection arrange of the transmission that control system 200 controls. The first column provides the gear or speed range. The second column through seventh column illustrate which ones of first selective coupler 202, second selective coupler 204, third selective coupler 206, fourth selective coupler 208, fifth selective coupler 210, and sixth selective coupler 212 are engaged (indicated by "1") and which ones of first selective coupler 202, second selective coupler 204, third selective coupler 206, fourth selective coupler 208, fifth selective coupler 210, and sixth selective coupler 212 are disengaged (indicated by "(blank)"). The eighth column and the ninth column illustrate which ones of solenoids 266, 270 are energized (indicated by "On") and which ones of solenoids 266, 270 are deenergized (indicated by "(blank)" or "Off")). The ninth column also illustrates whether solenoid 270 is applying hydraulic pressure to valve spool 290 of control valve 272 (indicated by "(Stroked)") or whether solenoid 270 is not applying hydraulic pressure to valve spool 290 (indicated by "(Destroked)"). FIG. 4 is only one example of any number of truth tables possible for achieving at least nine forward speed ratios, at least one reverse speed ratio, at least one neutral speed ratio, and at least one default speed ratios.

In the example of FIG. 4, the illustrated reverse speed ratio ("Rev") is achieved by having third selective coupler 206 and fifth selective coupler 210 in an engaged configuration, first selective coupler 202, second selective coupler 204, fourth selective coupler 208, and sixth selective coupler 212 in a disengaged configuration, solenoid 266 deenergized, and solenoid 270 energized. The illustrated seventh forward speed ratio ("7") is achieved by having second selective coupler 204 and third selective coupler 206 in an engaged configuration, first selective coupler 202, fourth selective coupler 208, fifth selection coupler 210, and sixth selective coupler 212 in a disengaged configuration, solenoid 266 energized, and solenoid 270 energized. A first default speed ratio ("Forward Default") is achieved by having second selective coupler 204 and third selective coupler 206 in an engaged configuration, first selective coupler 202, fourth selective coupler 208, fifth selection coupler 210, and sixth selective coupler 212 in a disengaged configuration, solenoid 266 deenergized, and solenoid 270 deenergized. A second default speed ratio ("Reverse Default") is achieved by having the third selective coupler 206 in an engaged configuration, first selective coupler 202, second selective coupler 204, fourth selective coupler 208, fifth selective coupler 210, and sixth selective coupler 212 in a disengaged configuration, solenoid 266 deenergized, and solenoid 270 deenergized.

Figure 5:
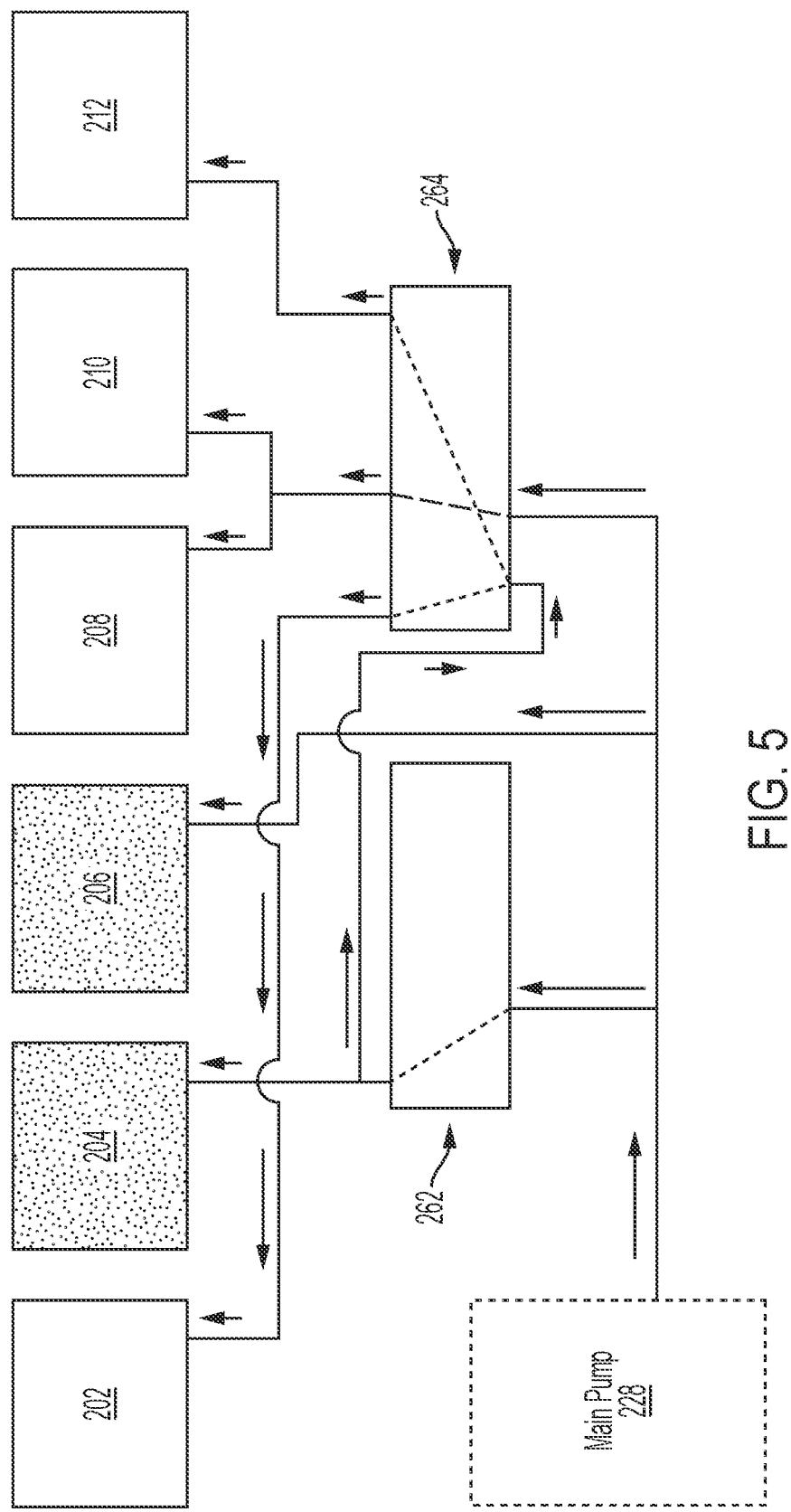
FIG. 5 is a hydraulic control schematic of the hydraulic control system of FIGS. 2A and 2B when the multi-speed planetary transmission is operating in a first forward speed ratio.

Referring now to FIGS. 5 and 7A, a hydraulic control schematic of control system 200 is shown when the multi-speed transmission is operating in a first forward speed ratio, illustratively the seventh forward speed ratio (see row "7" of truth table 300 of FIG. 4). When the transmission is operating in the seventh speed ratio, main pump 228 supplies pressurized hydraulic fluid to first valve assembly 262, second valve assembly 264, and third selective coupler 206. The supply of pressurized hydraulic fluid to third selective coupler 206 places third selective coupler 206 in an engaged configuration. In the seventh forward speed ratio, solenoid 266 of first valve assembly 262 is energized and valve spool 278 of control valve 268 is in the actuated position (see FIG. 7A). Therefore, the supply of pressurized hydraulic fluid to first valve assembly 262 is routed through control valve 268 to second selective coupler 204 and second valve assembly 264. In the seventh forward speed ratio, solenoid 270 of second valve assembly 264 is deenergized, and valve spool 290 is free to move within valve body 286 based on the hydraulic passage of valve body 286 to which the pressurized hydraulic fluid is supplied (see FIG. 7A). Therefore, the supply of pressurized hydraulic fluid from main pump 228 to second valve assembly 264 is routed through control valve 272 to fourth selective coupler 208 and fifth selective coupler 210, which are not engaged. In addition, the supply of pressurized hydraulic fluid from first valve assembly 262 to second valve assembly 264 is routed through control valve 272 to first selective coupler 202 and sixth selective coupler 212, which are not placed in an engaged configuration. Control system 200 will maintain the transmission in the seventh forward speed ratio until control system 200 receives a request or instruction to change the speed ratio or the transmission suffers a default condition. An exemplary default condition is an electrical power failure to TCM 284. Another default condition, for example, is a solenoid electrical circuit failure. It is contemplated, however, that other default conditions would result in the control system 200 defaulting to one of the forward or reverse default speed ratios.

Figure 6:
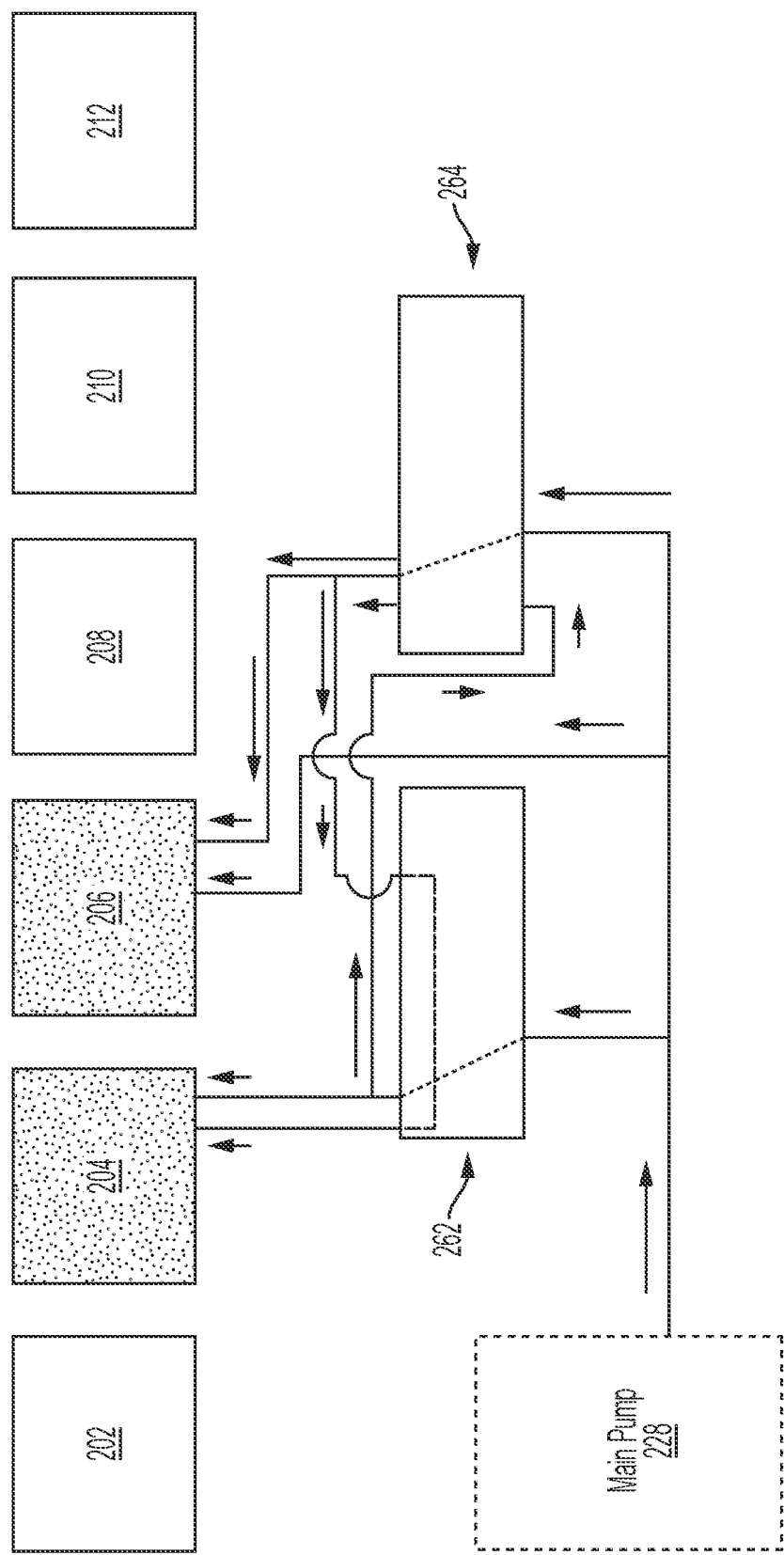
FIG. 6 a hydraulic control schematic of the hydraulic control system of FIGS. 2A and 2B when the multi-speed planetary transmission is operating in a first default speed ratio.

With reference now to FIGS. 6 and 7B, a hydraulic control schematic of control system 200 is shown when the multi-speed transmission has experienced a default condition while operating in a first forward speed ratio and shifted to the forward default speed ratio (see row "Forward Default" of truth table 300 of FIG. 4). When the transmission is operating in the forward default speed ratio, main pump 228 continues to supply pressurized hydraulic fluid to first valve assembly 262, second valve assembly 264, and third selective coupler 206. The supply of pressurized hydraulic fluid to third selective coupler 206 places third selective coupler 206 in an engaged configuration. When the transmission experiences the default condition, solenoid 270 is deenergized based on an electrical signal to solenoid 270 and supplies hydraulic pressure to control valve 272 to displace valve spool 290 along axis 292 to the actuated position. Therefore, the supply of pressurized hydraulic fluid to second valve assembly 264 is routed through control valve 272 to third selective coupler 206 and first valve assembly 262. In the exemplary embodiment shown, the electrical signal sent to solenoid 270 is a loss of electrical power to solenoid 270.

When the transmission experiences the default condition, solenoid 266 of first valve assembly 262 is deenergized based on an electrical signal to solenoid 266 and no longer supplies hydraulic pressure to control valve 268. Therefore, biasing member 282 attempts to biases valve spool 278 toward the unactuated position. However, the supply of pressurized hydraulic fluid from second valve assembly 264 holds valve spool 278 of control valve 268 in the actuated position because valve spool 290 of control valve 272 strokes faster than valve spool 278 of control valve 268. Therefore, the main supply of pressurized hydraulic fluid from main pump 228 is routed through first valve assembly 262 to second selective coupler 204 and second valve assembly 264. In the exemplary embodiment show, the electrical signal sent to solenoid 266 is a loss of electrical power to solenoid 266. The hydraulic fluid routed from first valve assembly 262 to second valve assembly 264 does not pass through second valve assembly 264 because of the axial position of valve spool 290 of control valve 272. The hydraulic fluid from second valve assembly 264 to first valve assembly 262 is routed through first valve assembly 262 to second selective coupler 204. The supply of pressurized hydraulic fluid to second selective coupler 204 and third selective coupler 206 places second selective coupler 204 and third selective coupler 206 in an engaged configuration.

While the forward default speed ratio has been described in connection with the transmission operating in the seventh forward speed ratio, control system 200 will default to the forward default speed ratio when the transmission is operating in any of the at least nine forward speed ratios. An advantage, among others, of the seventh forward speed ratio of control system 200 is that the seventh forward speed ratio provides an overdrive forward speed ratio between the output member and the input member of the transmission. It is contemplated, however, that the seventh forward speed ratio (or the forward default speed ratio) may be, for example, a direct drive forward speed ratio. An advantage, among others, of control system 200 and hydraulic default control system 260 is that an operator may control and bring the moving vehicle to a stop when the default condition occurs.

Figure 8:
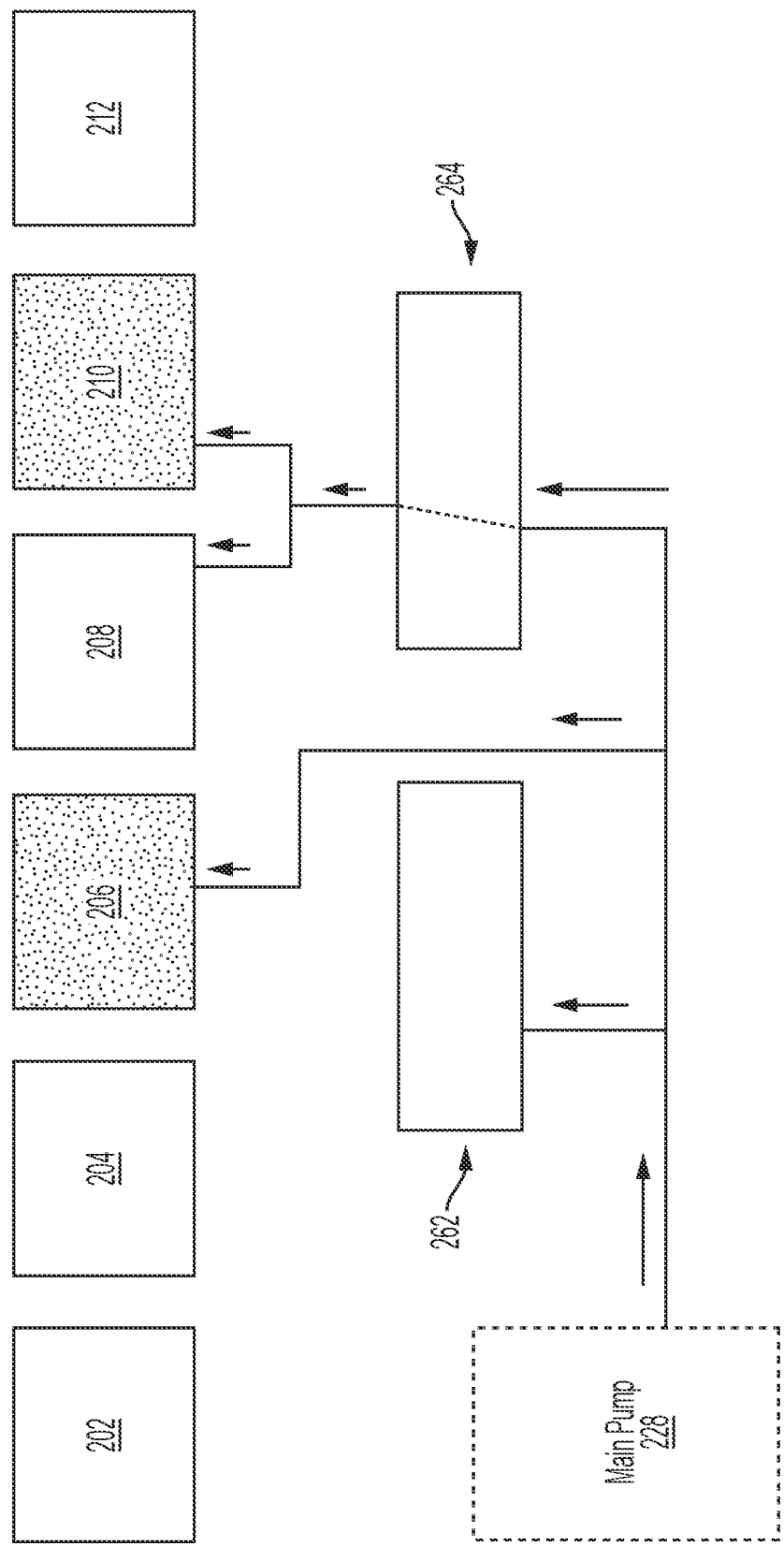
FIG. 8 is a hydraulic control schematic of the hydraulic control system of FIGS. 2A and 2B when the multi-speed planetary transmission is operating in the reverse speed ratio.
Figure 10A:
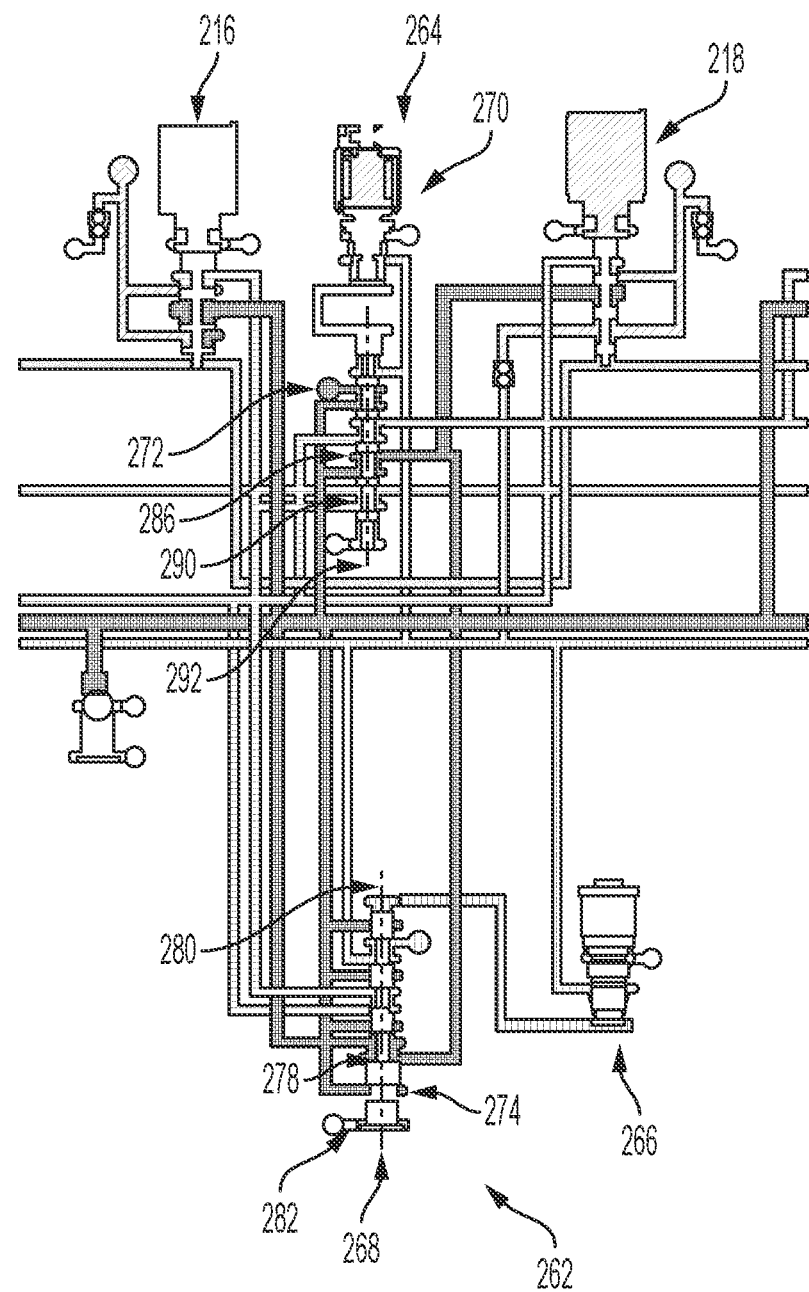
FIG. 10A is a partial schematic view of the hydraulic default control system of the hydraulic control system of FIGS. 2A and 2B when the multi-speed planetary transmission is operating in the reverse speed ratio.

Referring now to FIGS. 8 and 10A, a hydraulic control schematic of control system 200 is shown when the multi-speed transmission is operating in a first one of the at least one reverse speed ratio (see row "REV" of truth table 300 of FIG. 4). When the transmission is operating in the reverse speed ratio, main pump 228 supplies pressurized hydraulic fluid to first valve assembly 262, second valve assembly 264, and third selective coupler 206. The supply of pressurized hydraulic fluid to third selective coupler 206 places third selective coupler 206 in an engaged configuration. In the reverse speed ratio, solenoid 266 of first valve assembly 262 is deenergized and does not supply hydraulic pressure to control valve 268. Therefore, biasing member 282 biases valve spool 278 toward the unactuated position (see FIG. 10a), and the supply of pressurized hydraulic fluid to first valve assembly 262 does not pass through first valve assembly 262 because of the axial position of valve spool 278 of control valve 268. In the reverse speed ratio, solenoid 270 is energized and does not supply hydraulic pressure to first valve assembly 262. Therefore, valve spool 290 of control valve 272 is free to move within valve body 286 based on the hydraulic passage of valve body 286 to which the pressurized hydraulic fluid is supplied (see FIG. 10A). The supply of pressurized hydraulic fluid to second valve assembly 264 is routed through control valve 272 to fourth selective coupler 208, which is not placed in an engaged configuration, and fifth selective coupler 210, which is placed in an engaged configuration. Control system 200 will maintain the transmission in the reverse speed ratio until control system 200 receives a request or instruction to change the speed ratio or the transmission suffers a default condition such as, for example, electrical power failure to TCM 284.

Figure 9:
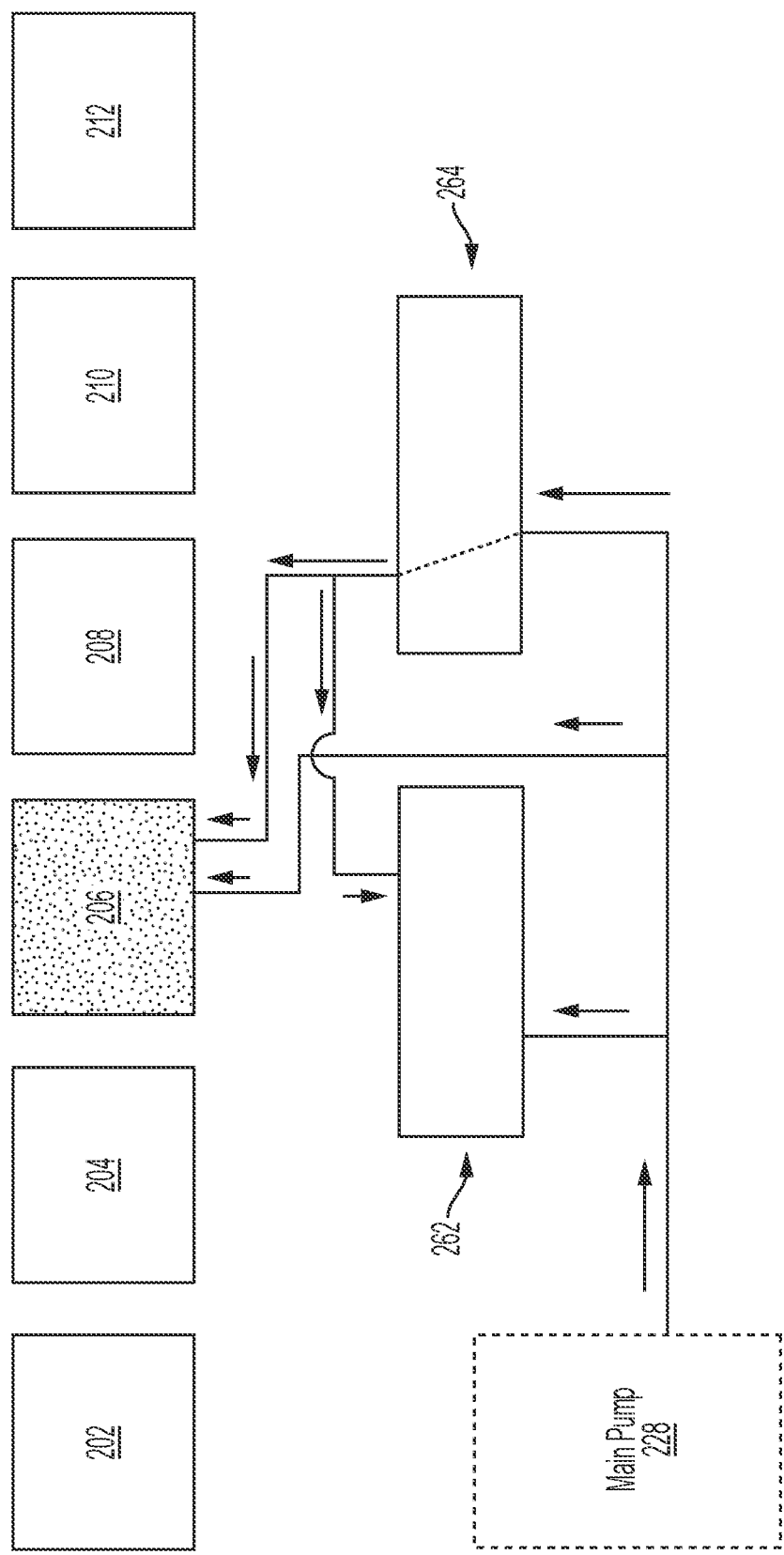
FIG. 9 is a hydraulic control schematic of the hydraulic control system of FIGS. 2A and 2B when the multi-speed planetary transmission is operating in a second default speed ratio.
Figure 10B:
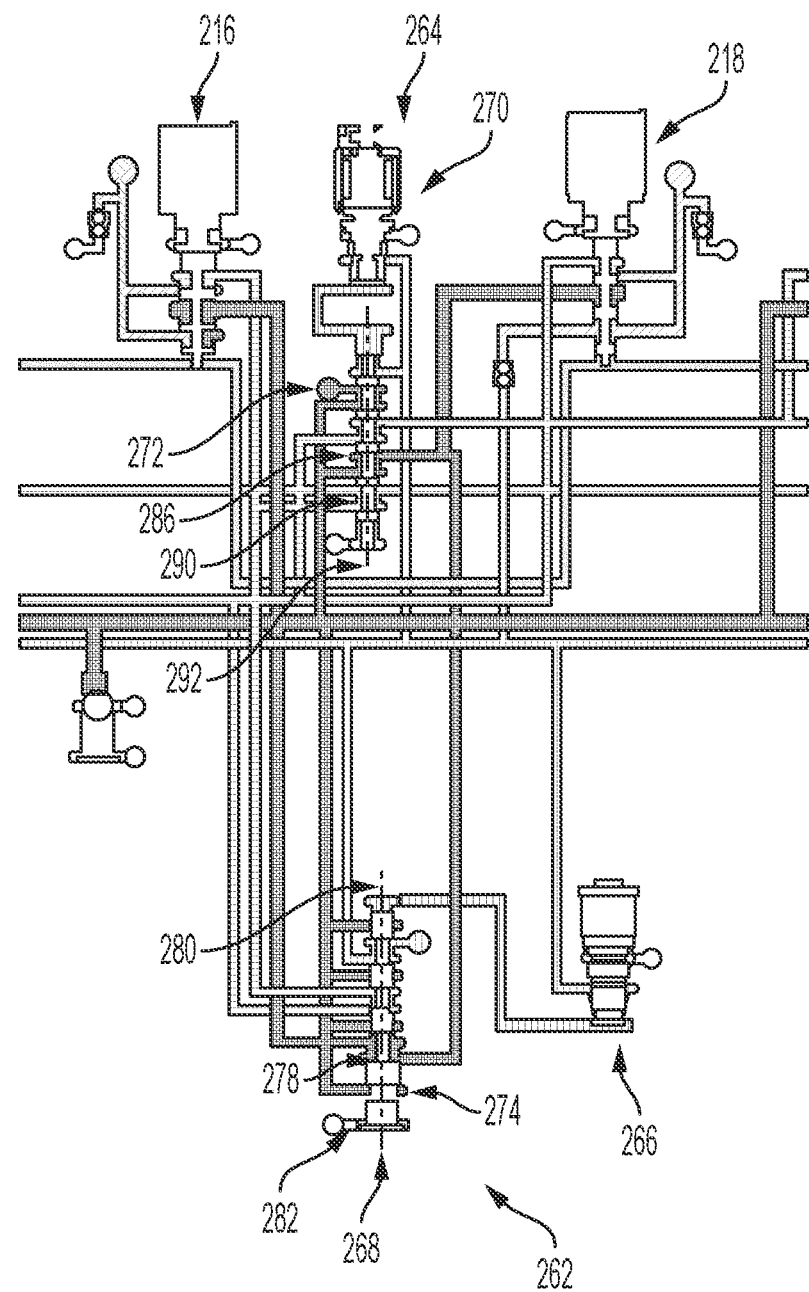
FIG. 10B is a partial schematic view of the hydraulic default control system of the hydraulic control system of FIGS. 2A and 2B when the multi-speed planetary transmission is operating in the second default speed ratio.

With reference now to FIGS. 9 and 10B, a hydraulic control schematic of control system 200 is shown when the multi-speed transmission has experienced a default condition while operating in the reverse speed ratio and shifted to the reverse default speed ratio (see row "Reverse Default" of truth table 300 of FIG. 4). While the transmission is operating in the reverse default speed ratio, main pump 228 continues to supply pressurized hydraulic fluid to first valve assembly 262, second valve assembly 264, and third selective coupler 206. The supply of pressurized hydraulic fluid to third selective coupler 206 places third selective coupler 206 in an engaged configuration. When the transmission experiences the default condition, solenoid 266 of first valve assembly 262 is deenergized based on an electrical signal to solenoid 266. Because solenoid 266 of first valve assembly 262 was already deenergized while the transmission was operating in the reverse gear ratio, valve spool 278 of control valve 268 remains in the unactuated position (see FIG. 10B). Therefore, the main supply of pressurized hydraulic fluid does not pass through second valve assembly 262 because of the axial position of valve spool 278 within valve body 274 of control valve 268. In the exemplary embodiment shown, the electrical signal sent to solenoid 266 is the maintain of a loss of electrical power to solenoid 266.

When the transmission experiences the default condition, solenoid 270 is deenergized based on an electrical signal to solenoid 270 and supplies hydraulic pressure to control valve 272 to displace valve spool 290 to the actuated position (see FIG. 10B). Therefore, the main supply of pressurized hydraulic fluid to second valve assembly 264 is routed through control valve 272 to third selective coupler 206 and first valve assembly 262. Because of the unactuated position of valve spool 278 of control valve 268 of first valve assembly 262, the supply of pressurized hydraulic fluid from second valve assembly 264 to first valve assembly 262 does not pass through first valve assembly 262. In the exemplary embodiment shown, the electrical signal sent to solenoid 270 is a loss of electrical power to solenoid 270.

An advantage, among others, of the reverse default speed ratio is that an operator may control and bring the moving vehicle to a stop when the default condition occurs. In addition, the reverse default speed ratio corresponds to a neutral configuration of the transmission. Because the vehicle will be reversing at a low speed, the neutral configuration of the reverse default speed ratio permits the operator to apply the brakes to bring the moving vehicle to stop. Another advantage, among others, is that the neutral configuration of the reverse default speed ratio signals to an operator that a default condition has occurred.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
   wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, wherein the first default speed ratio is a speed ratio corresponding to a direct drive forward speed ratio of the transmission and the second default speed ratio is a neutral speed ratio of the transmission.

2. The control system of claim 1, wherein the default condition is an electrical power failure.

3. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, wherein each of the first and second solenoids has an energized configuration and a deenergized configuration, and, when the transmission is in the first one of the at least one forward speed ratio, the first solenoid is in the energized configuration and supplies hydraulic pressure to the first control valve and the second solenoid is in the energized configuration and does not supply hydraulic pressure to the second control valve.

4. The control system of claim 3, wherein, when the transmission is in the first default speed ratio, the first solenoid is in the deenergized configuration and does not supply hydraulic pressure to the first control valve and the second solenoid is in the deenergized configuration and does supply hydraulic pressure to the second control valve.

5. The control system of claim 3, wherein the default condition is an electrical power failure.

6. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, wherein the first control valve includes a first spool valve and the second control valve includes a second spool valve configured to stroke faster than the first spool valve.

7. The control system of claim 6, wherein the default condition is an electrical power failure.

8. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, wherein the default condition is an electrical power failure and the electrical power failure is to a transmission control module electrically coupled to the first and second solenoids.

9. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, wherein the second solenoid is a variable force solenoid.

10. The control system of claim 9, wherein the default condition is an electrical power failure.

11. A hydraulic control system for a transmission having an input member and an output member and operable in at least one forward speed ratio between the output member and the input member and in at least one reverse speed ratio between the output member and the input member, comprising:
   a hydraulic default control system including:
      a first valve assembly having a first control valve controlled by a first solenoid; and
      a second valve assembly having a second control valve controlled by a second solenoid,
wherein the hydraulic default control system is configured to shift the transmission to a first default speed ratio when the transmission is operating in a first one of the at least one forward speed ratio and experiences a default condition and to shift the transmission to a second default speed ratio when the transmission is operating in a reverse speed ratio and experiences the default condition, further comprising a plurality of linear force solenoid valves hydraulically coupled to the hydraulic default control system.

12. The control system of claim 11, wherein the hydraulic default control system is configured to selectively route pressurized hydraulic fluid to at least one of the plurality of linear force solenoid valves in each of the first and second default speed ratios.

13. The control system of claim 11, wherein the default condition is an electrical power failure.

14. A hydraulic control system for a transmission, comprising:
   a hydraulic default control system including:
      a first valve assembly having a first control valve controlled by a first solenoid; and
      a second valve assembly having a second control valve controlled by a second solenoid,
   wherein the first and second valve assemblies are configured to shift the transmission from a first forward speed ratio to a default speed ratio based on an electrical signal to at least one of the first and second valve assemblies, the first solenoid is configured to receive the electrical signal, and the second solenoid is configured to receive the electrical signal, the electrical signal is a loss of electrical power to each of the first and second solenoids.

15. The control system of claim 14, further comprising a pump configured to supply pressurized hydraulic fluid to each of the first and second valve assemblies of the hydraulic default control system independent of the electrical system.

16. A hydraulic control system for a transmission, comprising:
a hydraulic default control system including:
a first valve assembly having a first control valve controlled by a first solenoid; and
a second valve assembly having a second control valve controlled by a second solenoid,
wherein the first and second valve assemblies are configured to shift the transmission from a first forward speed ratio to a default speed ratio based on an electrical signal to at least one of the first and second valve assemblies, wherein the default speed ratio is one of a neutral speed ratio or a direct drive speed ratio.

17. A transmission having an input member and output member and operable in at least one forward speed ratio between the output member and the input member and at least one reverse speed ratio between the output member and the input member, comprising:
a plurality of planetary gearsets operatively coupled to the input member;
a plurality of selective couplers operatively coupled to the plurality of planetary gearsets, each of the plurality selective couplers having an engaged configuration and a disengaged configuration, the plurality of selective couplers selectively engageable to establish the at least one forward speed ratio and the at least one reverse speed ratio between the output member and the input member;
a hydraulic control system hydraulically coupled to the plurality of selective couplers and including a hydraulic default control system,
wherein the hydraulic default control system is configured to selectively engage at least a first portion of the plurality of selective couplers to establish a first default speed ratio when the transmission is operating in the at least one forward speed ratio and experiences a default condition and is configured to selectively engage at least a second portion of the plurality of selective couplers to establish a second default speed ratio when the transmission is operating in the at least one reverse speed ratio and experiences the default condition, wherein the plurality of selective couplers include a first selective coupler, a second selective coupler, a third selective coupler, a fourth selective coupler, a fifth selective coupler, and a sixth selective and wherein in the first default speed ratio, the second selective coupler and the third selective coupler are in the engaged configuration and the first selective coupler, the fourth selective coupler, the fifth selective coupler, and the sixth selective coupler are in the disengaged configuration.

18. The transmission of claim 17, further comprising a pump configured to supply pressurized hydraulic fluid to the default hydraulic control system.

19. The transmission of claim 18, wherein the pump is configured to supply pressurized hydraulic fluid to at least one of the plurality of selective couplers independent of the default hydraulic control system, the at least one of the plurality of selective couplers placed in the engaged configuration.

20. The transmission of claim 18, wherein the pump is configured to continue to supply pressurized hydraulic fluid even when the transmission experiences the default condition.

21. The transmission of claim 17, wherein in the second default speed ratio, the third selective coupler in the engaged configuration and the first selective coupler, the second selective coupler, the fourth selective coupler, the fifth selective coupler, and the sixth selective coupler are in the disengaged configuration.

22. A transmission having an input member and output member and operable in at least one forward speed ratio between the output member and the input member and at least one reverse speed ratio between the output member and the input member, comprising:
a plurality of planetary gearsets operatively coupled to the input member;
a plurality of selective couplers operatively coupled to the plurality of planetary gearsets, each of the plurality selective couplers having an engaged configuration and a disengaged configuration, the plurality of selective couplers selectively engageable to establish the at least one forward speed ratio and the at least one reverse speed ratio between the output member and the input member;
a hydraulic control system hydraulically coupled to the plurality of selective couplers and including a hydraulic default control system, the hydraulic default control system includes:
a first valve assembly having a first control valve hydraulically coupled to a first solenoid; and
a second valve assembly having a second control valve hydraulically coupled to a second solenoid, wherein the hydraulic default control system is configured to selectively engage at least a first portion of the plurality of selective couplers to establish a first default speed ratio when the transmission is operating in the at least one forward speed ratio and experiences a default condition and is configured to selectively engage at least a second portion of the plurality of selective couplers to establish a second default speed ratio when the transmission is operating in the at least one reverse speed ratio and experiences the default condition, wherein each of the first and the second solenoids have an energized configuration and a deenergized configuration, and, when the transmission is in the at least one forward speed ratio, the first solenoid is in the energized configuration and supplies hydraulic pressure to the first control valve and the second solenoid is in the energized configuration and does not supply hydraulic pressure to the second control valve.

23. The control system of claim 22, wherein, when the transmission is in the first default speed ratio, the first solenoid is in the deenergized configuration and does not supply hydraulic pressure to the first control valve and the second solenoid is in the deenergized configuration and does supply hydraulic pressure to the second control valve.

* * * * *